US012779665B2

(12) United States Patent
Nakashima

(10) Patent No.: US 12,779,665 B2
(45) Date of Patent: Nov. 3, 2026

(54) MOBILE OPERATION DEVICE, MACHINE SYSTEM, AND MEMORY CONTROL PROGRAM FOR MOBILE OPERATION DEVICE

(71) Applicant: FANUC CORPORATION, Yamanashi (JP)

(72) Inventor: Yuji Nakashima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/992,567

(22) PCT Filed: Sep. 29, 2022

(86) PCT No.: PCT/JP2022/036517
§ 371 (c)(1),
(2) Date: Jan. 9, 2025

(87) PCT Pub. No.: WO2024/069880
PCT Pub. Date: Apr. 4, 2024

(65) Prior Publication Data
US 2025/0256391 A1 Aug. 14, 2025

(51) Int. Cl.
*B25J 9/00* (2006.01)
*B25J 9/16* (2006.01)
*G05B 19/409* (2006.01)
*G05B 19/414* (2006.01)

(52) U.S. Cl.
CPC ........... *B25J 9/0081* (2013.01); *B25J 9/1669* (2013.01); *G05B 19/409* (2013.01); *G05B 19/4145* (2013.01); *G05B 2219/36159* (2013.01)

(58) Field of Classification Search
CPC ...... B25J 9/0081; B25J 9/1669; B25J 9/1656; G05B 19/409; G05B 19/4145; G05B 19/42; G05B 2219/36159
USPC .......... 700/264, 78; 714/763, 765, 766, 767, 714/752, 753, 746, 49, 15, 18; 713/162; 711/5
See application file for complete search history.

(56) References Cited

U.S. PATENT DOCUMENTS 5,918,242 A * 6/1999 Sarma ................. G06F 12/0893
11,387,848 B1 * 7/2022 Berman ............ H03M 13/2906
2008/0082872 A1 * 4/2008 Nagasaka ........... G06F 11/1068
2008/0126905 A1 * 5/2008 Deguchi ............. G06F 11/1044
(Continued)

FOREIGN PATENT DOCUMENTS

JP S63-295150 A 12/1988
JP 2003-068095 A 3/2003
(Continued)

*Primary Examiner* — Ellis B. Ramirez
(74) *Attorney, Agent, or Firm* — HAUPTMAN HAM, LLP

(57) ABSTRACT

The present invention provides a mobile operation device, a machine system, and a memory control program for the mobile operation device that are capable of suppressing an increase in memory usage and a decrease in processing speed while maintaining reliability of the system. The mobile operation device is a portable device for operating a machine, and comprises a memory with a plurality of storage units, a code assigning unit that assigns an error-correcting code to data in the memory, and an encoding region specifying unit that specifies a region to which the data assigned with the error-correcting code is to be stored.

15 Claims, 3 Drawing Sheets

3

(56) References Cited

U.S. PATENT DOCUMENTS

| | | | | |
|---|---|---|---|---|
| 2010/0293439 | A1* | 11/2010 | Flynn | G06F 11/108 |
| 2012/0131413 | A1* | 5/2012 | Thatcher | G06F 3/0619 |
| 2012/0221924 | A1* | 8/2012 | Flynn | G06F 11/1008 |
| 2013/0070577 | A1* | 3/2013 | Suzuki | G11B 7/24085 |
| 2018/0197112 | A1* | 7/2018 | Sugiyama | G05B 13/0265 |
| 2018/0316127 | A1* | 11/2018 | Fujimori | G11C 7/00 |
| 2020/0338737 | A1* | 10/2020 | Katou | G05B 19/409 |

FOREIGN PATENT DOCUMENTS

| | | | | |
|---|---|---|---|---|
| JP | 2003-316663 | A | | 11/2003 |
| JP | 2007061940 | A | * | 3/2007 |
| JP | 2008-139908 | A | | 6/2008 |
| JP | 2010167507 | A | * | 8/2010 |
| JP | 2012228734 | A | * | 11/2012 |
| JP | 2013056378 | A | * | 3/2013 |
| JP | 2018-097723 | A | | 6/2018 |
| JP | 6438763 | B2 | * | 12/2018 |
| JP | 6612080 | B2 | * | 11/2019 |
| JP | 2020-078865 | A | | 5/2020 |
| JP | 2021-047774 | A | | 3/2021 |

* cited by examiner

MOBILE OPERATION DEVICE, MACHINE SYSTEM, AND MEMORY CONTROL PROGRAM FOR MOBILE OPERATION DEVICE

RELATED APPLICATIONS

The present application is a National Phase of International Application No. PCT/JP2022/036517 filed Sep. 29, 2022.

FIELD

The present disclosure relates to a mobile operation device, a machine system, and a memory control program for the mobile operation device.

BACKGROUND

In recent years, a mobile operation device connected to a machine control device which portable controls a machine such as a robot or CNC (Computer Numerical Control) machine tool has been used. Here, an example of the mobile operation device may be a teach pendant for teaching an operation or the like with respect to an industrial robot. This teach pendant is used, for example, to cause the industrial robot so as to perform a predetermined processing operation on a workpiece in a factory or the like in which the industrial robot is actually installed.

Note that the teach pendant (mobile operation device) may be removable and may be used in a factory or the like in which an industrial robot (machine) is installed, and therefore is exposed to electromagnetic noise or the like generated from various machines around the industrial robot or the industrial robot by itself. Specifically, since the teach pendant is often used in an environment in which various noises including electromagnetic noise are present, data stored in a memory provided on the teach pendant may cause an error due to an influence of the electromagnetic noise or the like.

Therefore, for example, an error correction code (ECC: Error-Correcting Code/Error-Correction Code) may be imparted to the memory (main memory) of the teach pendant. Here, the error correction code is, for example, a code added to detect and correct an error of data generated in the memory on a receiving side (reading side) when storing (writing) the data in the memory. This error correction code (ECC data) is generated based on a predetermined protocol from original data, for example, and the generated ECC data is added to the original data and stored in a memory.

Specifically, the ECC data is, for example, used to detect and correct an error (fault) in the data read from the memory on the receiving side. As a processing of generating the ECC data, for example, original data is cut into a predetermined length, and a predetermined protocol is applied to the cut data to be generated. Further, the data with the ECC data added to the original data is written in a main memory composed of, for example, a dynamic random access memory (DRAM) in the teach pendant.

Further, on a data reading side, the ECC data added to the original data is used to detect and correct errors in the data read from the memory. That is, at the reading side, the ECC data is separated from the original data at the time of reading the data, and it is confirmed whether or not there is an error in the original data by applying the predetermined protocol. In addition, when an error is detected on the reading side, correct data is restored based on the ECC data.

Here, although various systems have been proposed as an error correction code (ECC), it is not possible to completely detect and correct all errors, but it is determined by each system whether to detect or correct errors up to many bits per predetermined length. In general, when the error correction code is lengthened, an error (number of bits) that may be detected/corrected increases, so that memory capacity and computational complexity used to detect/correct errors also increase.

Specifically, when the number of bits to be detected/corrected by applying the error correction code is increased, the data amount and the processing time for the error correction code become longer. Therefore, the application of the error correction code is selected in consideration of the request of the number of bits to be detected/corrected, the available memory capacity, the bandwidth, and the like. Note that the error correction code, for example, various ones such as a Hamming Code, a Longitudinal and Vertical Parity Code, a Reed Solomon Code, and a BCH code may be used.

Conventionally, various proposals have been made as a teach pendant including a function of imparting an error correction code.

CITATION LIST

Patent Literature

[PTL 1] Japanese Unexamined Patent Publication (Kokai) No. 2003-068095

[PTL 2] Japanese Unexamined Patent Publication (Kokai) No. 2021-047774

SUMMARY

Technical Problem

As described above, in a factory where an industrial robot is installed, a mobile teach pendant is generally used in a vicinity of the industrial robot, and therefore is exposed to electromagnetic noise or the like generated from various machines in the vicinity or around the industrial robot itself. Therefore, there is a possibility that an error occurs in the data stored in the memory of the teach pendant, and the error correction code is applied.

However, when an error correction code is applied, it is necessary to add data (ECC data) for the error correction code, and processing for performing error correction (detection and correction) is also required. That is, when the error correction code is applied in a teach pendant, an amount of memory used in the teach pendant may be increased, and the processing speed may also be reduced.

Note that the teach pendant is not limited to a device that taught a predetermined operation for an industrial robot to a workpiece, and may be a mobile operation device that portable operates various machines such as various robots, CNC machine tools or collaborative robots. Specifically, the mobile operation device described herein is a mobile (portable) device, including a teach pendant, that operates various machines.

As described above, in a memory control program of the mobile operation device, the machine system and the mobile operation device, it is desired to suppress an increase in memory usage and a decrease in processing speed while maintaining reliability.

Solution to Problem

According to an embodiment of the present invention, there is provided a mobile operation device for portable operating a machine including a memory, a code imparting unit, and an encoding region specifying unit. The memory includes a plurality of storage units, the code imparting unit is configured to impart an error correction code to data in the memory; and the encoding region specifying unit is configured to specify a region for storing the data to which the error correction code is imparted.

The objects and effects of the present invention will be recognized and obtained by using the components and combinations pointed out in the claims. Both the general description described above and the detailed description below are exemplary and descriptive and do not limit the invention described in the claims.

DESCRIPTION OF EMBODIMENTS

Hereinafter, examples of a mobile operation device, a machine system, and a memory control program of the mobile operation device according to the present embodiment will be described in detail with reference to the accompanying drawings. In each of the drawings, the same or similar constituent elements are assigned the same or similar reference signs. Furthermore, the embodiments described below do not limit the technical scope and meaning of the terms of the invention set forth in the claims.

Figure 1:
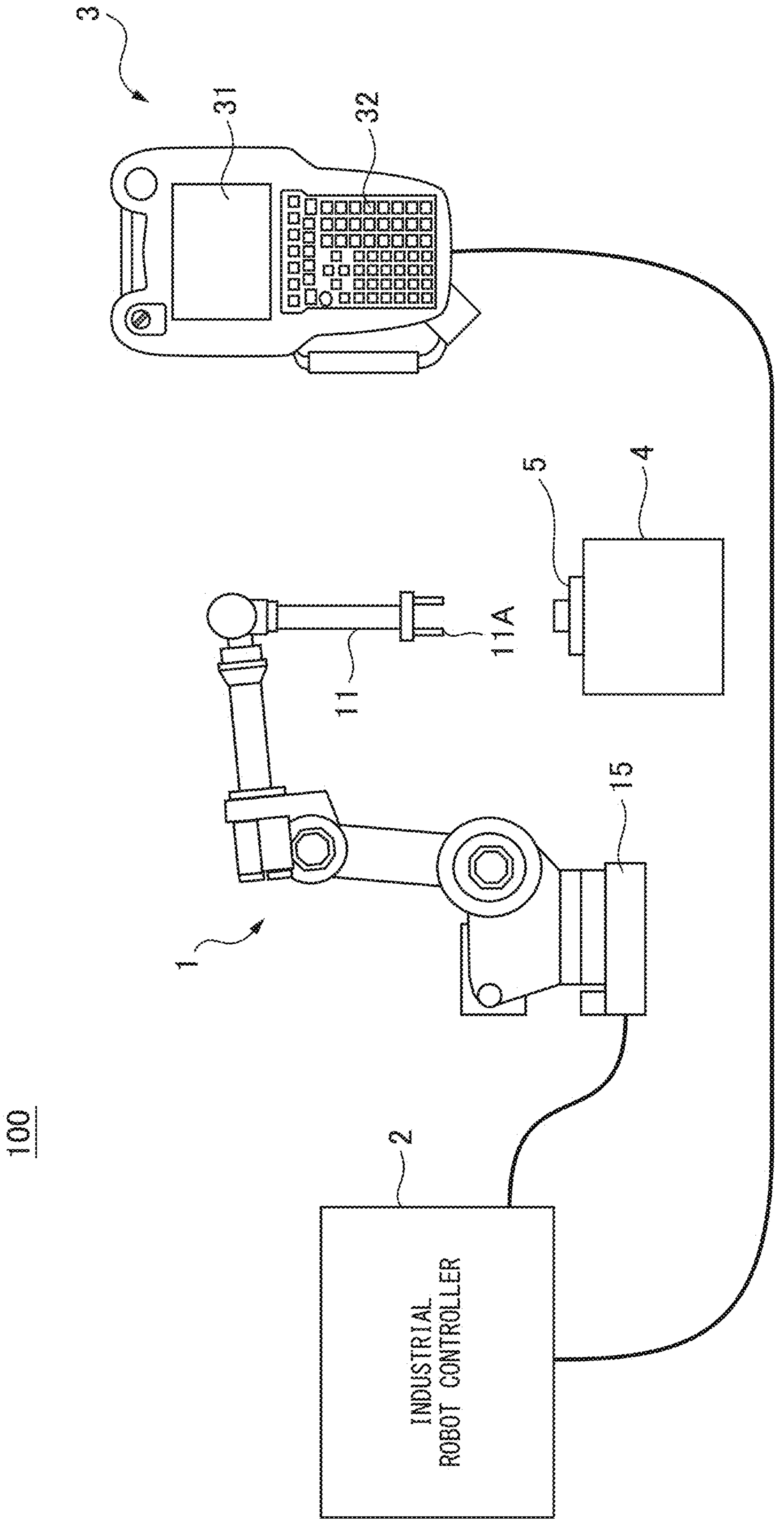
FIG. 1 is a diagram schematically depicting an industrial robot system as an example of a machine system according to the present embodiment.

FIG. 1 is a diagram schematically depicting an industrial robot system as an example of a machine system according to the present embodiment. As depicted in FIG. 1, an industrial robot system 100 as an example of a machine system according to the present embodiment includes an industrial robot (machine) 1, an industrial robot controller (machine control device) 2, and a teach pendant (mobile operation device) 3.

A hand unit (end effector) 11A is provided at a tip of an arm 11 of the industrial robot (robot) 1, and the hand unit 11A performs predetermined processing on the workpiece (object) 5 placed on the workbench 4, for example. The industrial robot controller (robot controller) 2 controls the robot 1 based on, for example, a program (software program) installed in advance.

Note that a camera (not shown) for capturing the workpiece 5 or the like may be attached to a vicinity of the hand unit 11A of the arm 11, and an image including the workpiece 5 captured by the camera may be output to the robot controller 2. In addition, various modifications and variations may be possible in accordance with a type of machine to be applied and a processing to be required.

The teach pendant 3 includes a display screen 31 and an operation unit 32, and is connected to the robot controller 2 by wire. The teach pendant 3 is used to teach a predetermined operation using the hand unit 11A to the robot 1 via the robot controller 2 by operating the operation unit 32 while a worker (teaching person) confirms the image of the display screen 31.

Here, since the teach pendant 3 is used near the robot 1 installed in an actual factory, for example, the teach pendant 3 is exposed to electromagnetic noise or the like generated from various machines around of the robot 1 or the robot 1 of itself. Specifically, since the teach pendant 3 is often used in an environment where various noises including an electromagnetic noise are present, data stored in the memory provided on the teach pendant 3 may cause an error (fault) due to the influence of the electromagnetic noise or the like.

Note that, in FIG. 1, the teach pendant (mobile operation device) 3 may be connected to the robot controller 2 by wire, but may be possible to be connected to the robot controller 2 by radio. The mobile operation device 3 is not limited to the teach pendant as depicted in FIG. 1, but may be, for example, a tablet (tablet computer) or the like connected to the robot controller 2 in a wired or wireless manner. Further, the mobile operation device 3 is not limited to a devise for operating a robot such as an industrial robot or a collaborative robot, a CNC machine tool or the like, but may be widely applied as a mobile operation device that portable controls various machines.

Figure 2:
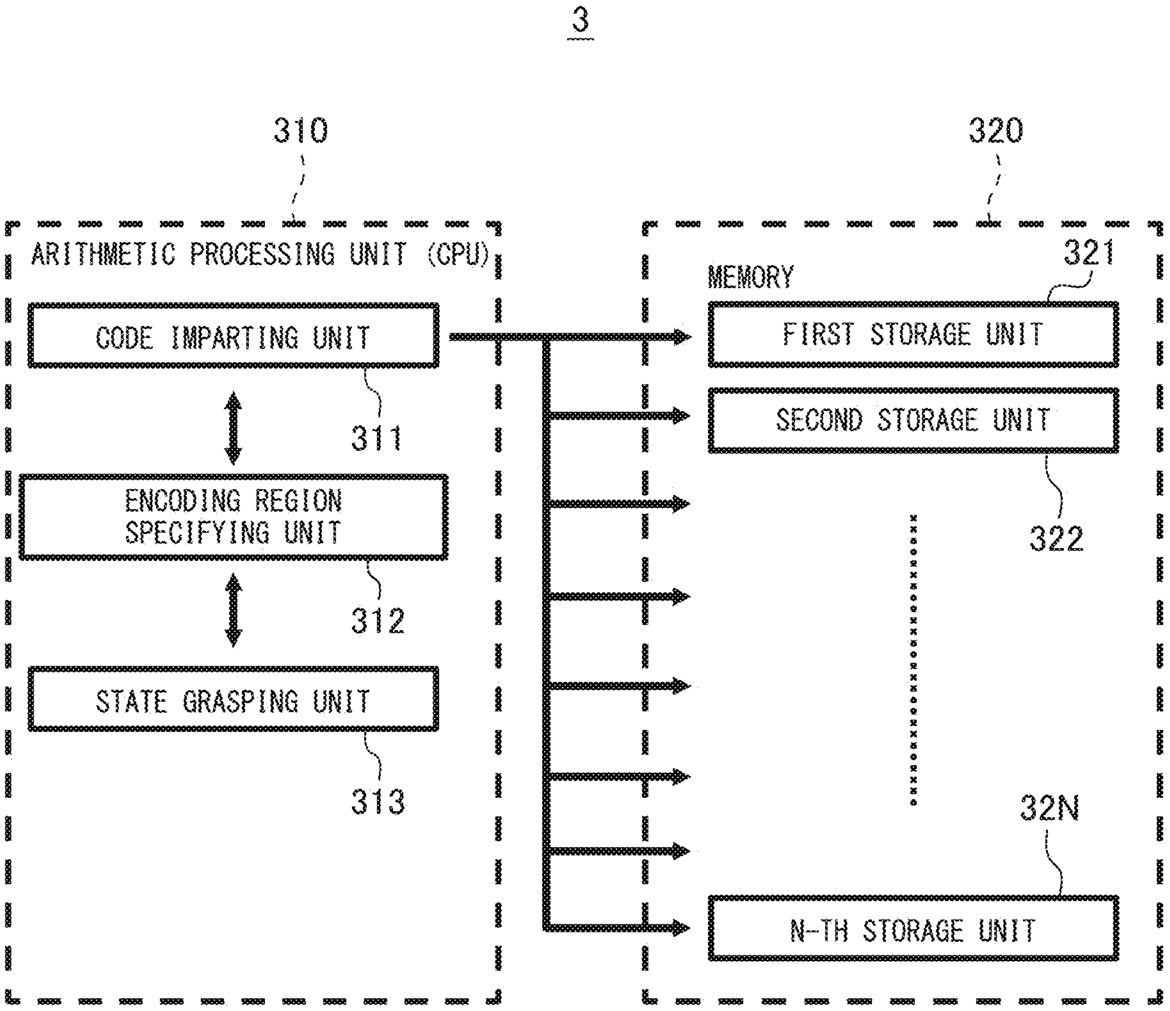
FIG. 2 is a block diagram depicting a main part configuration in an example of a mobile operation device according to the present embodiment.

FIG. 2 is a block diagram depicting a main part configuration in an example of a mobile operation device according to the present embodiment, and a main part of the teach pendant 3 in the industrial robot system 100 depicted in FIG. 1 is functionally illustrated. As depicted in FIG. 2, the teach pendant 3 includes an arithmetic processing unit (CPU (Central Processing Unit), MPU (Micro Processing Unit)) 310, and a memory (storage device) 320.

The CPU 310 includes a code imparting unit 311, an encoding region specifying unit 312, and a state grasping unit 313. The code imparting unit 311 imparts an error correction code to the data in the memory 320, and the encoding region specifying unit 312 specifies a region for storing the data to which the error correction code is imparted, and the state grasping unit 313 grasps the state of the teaching operation board 3.

The memory 320 includes, for example, N storage units (a first storage unit (memory block) 321, a second storage unit 322, . . . , an N-th storage unit 32N). Here, the memory 320 is a main memory (e.g. DRAM: Dynamic Random Access Memory) of the CPU 310 in the teach pendant 3, and it is possible to control whether or not to cause any storage units 321 to 32N to function an error correction code.

The state grasping unit 313, for example, grasps a state of an application program (program) executed by the CPU 310 of the teach pendant 3 according to a control command from the robot controller 2. The encoding region specifying unit 312, for example, specifies a region for storing the data to which the error correction code has been imparted by the code imparting unit 311 among the plurality of storage units 321 to 32N based on an output of the state grasping unit 313.

The encoding region specifying unit 312 specifies a storage unit that stores data to which the error correction code is imparted in a plurality of (e.g. N) storage units 321, 322, . . . , 32N included in the memory 320. Specifically, based on the output of the state grasping unit 313, the encoding region specifying unit 312 switches a capacity of the region for storing data to which the error correction code, which is an important data where an error occurs due to, for example, an electromagnetic noise or the like.

Here, the data stored in the region specified by the encoding region specifying unit 312, that is, the data to which the error correction code has been applied by the code imparting unit 311 may be determined by, for example, the state of the program grasped by the state grasping unit 313.

Concretely, for example, when the program executed by the CPU 310 is directly related to the industrial robot system 100 such as operating the industrial robot 1, the data to which the error correction code is applied is written in the region of the memory 320 specified by the encoding region specifying unit 312. On the other hand, for example, when the program executed by the CPU 310 is not directly related to the industrial robot system 100 such as the screen shot photographing of the display screen 31 of the teach pendant 3 or the collection of a log, the data that does not impart the error correction code is written in the memory 320.

Specifically, the code imparting unit 311 imparts an error correction code to the data when the program executed by the CPU 310 grasped by the state grasping unit 313 is directly related to the system, and does not impart an error correction code to the data when the program is not directly related to the system.

In other words, the encoding region specifying unit 312 specifies a region for storing data to which the error correction code is imparted to the data when the program executed by the CPU 310 grasped by the state grasping unit 313 is directly related to the system. On the other hand, the encoding region specifying unit 312 specifies a region for storing data that does not impart an error correction code to the data when the program executed by the CPU 310 grasped by the state grasping unit 313 is not directly related to the system.

As described above, based on the state of the program grasped by the state grasping unit 313, the encoding region specifying unit 312 switches the capacity of the region for storing the data to which the error correction code is applied among the plurality of storage units 321 to 32N.

Note that, the determination as to whether or not the code imparting unit 311 applies the error correction code may be determined by the state grasping unit 313 wherein the state grasping unit 313 grasps the program performed by the CPU 310. The grasping of the program by the state grasping unit 313 may also be confirmed by, for example, a control command for the teach pendant 3 from the robot controller 2. Furthermore, the determination as to whether or not to impart the error correction code is not limited to determining whether the program executed by the CPU 310 is directly related to the system.

Specifically, the state grasping unit 313 may grasp an operation, a use state, or other various states of the teach pendant 3, and it is possible to determine whether or not the code imparting unit 311 applies the error correction code, based on an output of the state grasping unit 313. Alternatively, on the basis of the output of the state grasping unit 313, the encoding region specifying unit 312 may specify a region for storing the data to which the error correction code has been applied among the plurality of storage units 321 to 32N of the memory 320.

Here, the data for which the code imparting unit 311 applies the error correction code is, for example, important data which is directly related to a system that needs to be protected by applying an error correction code. On the other hand, the data in which the code imparting unit 311 does not impart the error correction code is, for example, data where a certain degree of error may be permitted, and it is possible to capture data that is preferred to avoid an increase in memory usage and a decrease in processing speed due to application of an error correction code. Therefore, it possible to suppress an increase in memory usage and a decrease in processing speed while maintaining the reliability of the operation of the teach pendant 3 (industrial robot system 100).

Figure 3:
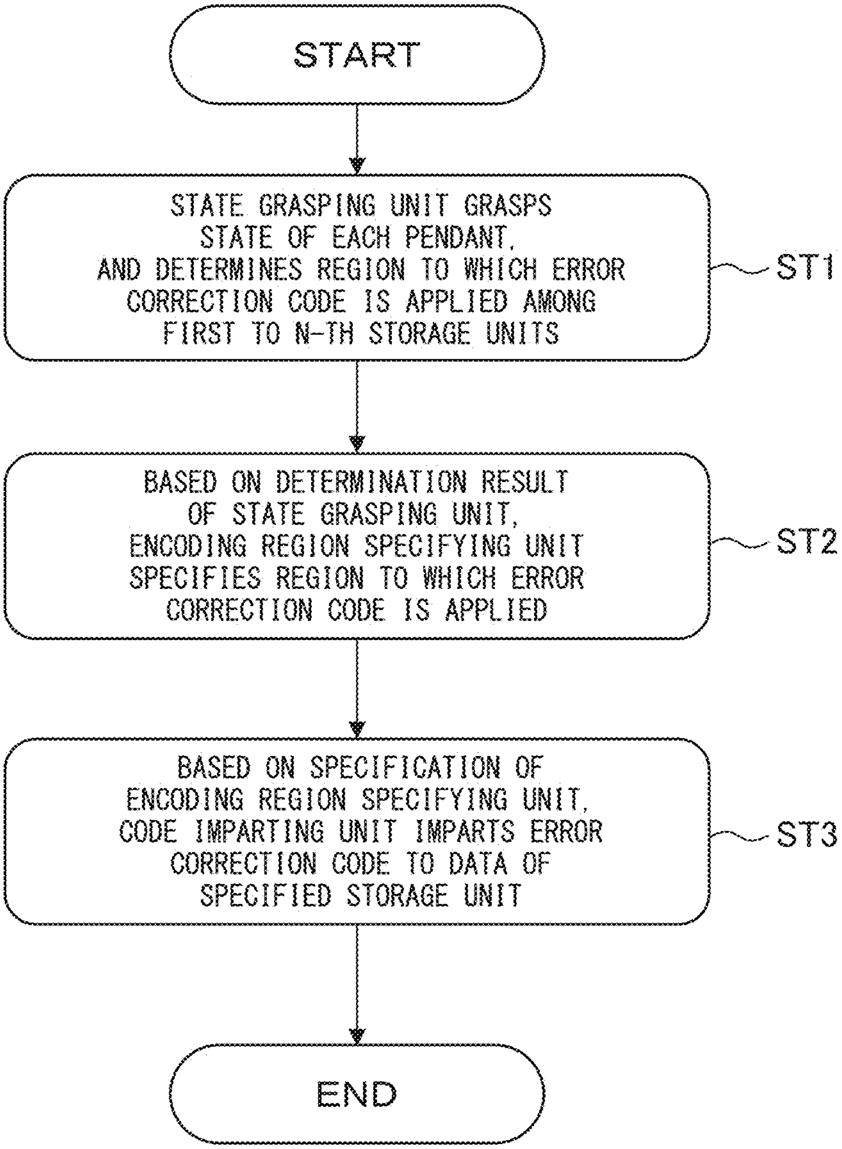
FIG. 3 is a flowchart for explaining an example of processing in an example of a memory control program of the mobile operation device according to the present embodiment.

FIG. 3 is a flowchart for explaining an example of processing in an example of a memory control program of the mobile operation device according to the present embodiment, and for example, explaining a processing of a program executed by the arithmetic processing unit 310 of the teach pendant 3 depicted in FIG. 2.

As depicted in FIG. 3, when an embodiment of the memory control program of the teach pendant is started (START), in step ST 1, the state grasping unit 313 grasps a state of the teach pendant 3, and determines a region to which an error correction code is applied (a region in which the ECC is applied to protect) among a first storage unit to an N-th storage unit (memory blocks 321 to 32N) to which the error correction code may be applied.

Next, in step ST 2, based on a determination result of the state grasping unit 313, the encoding region specifying unit 312 specifies a region to which the error correction code is applied. Specifically, as described above, based on the output of the state grasping unit 313, the encoding region specifying unit 312 specifies a region for storing the data to which the error correction code is applied among the plurality of storage units 321 to 32N of the memory 320.

Further, in step ST 3, based on a specification of the encoding region specifying unit 312, the code imparting unit 311 imparts an error correction code to the data of the specified storage unit. Specifically, the code imparting unit 311 imparts the error correction code to the data of the region in which the data obtained by imparting the error correction code in the memory 320 specified by the encoding region specifying unit 312 is stored.

Note that the memory control program for the mobile operation device according to the present embodiment described above may be recorded in a computer-readable non-temporary recording medium or non-volatile semiconductor storage device and provided, or may be provided via wired or wireless communication. Here, as a computer-readable non-temporary recording medium, for example, an optical disk such as a CD-ROM (Compact Disc Read Only Memory) or a DVD-ROM, or a hard disk device, and the like may be considered. Further, a PROM (Programmable Read Only Memory), a Flash Memory (registered trademark), and the like are conceivable as nonvolatile semiconductor memory devices. In addition, the distribution from the server device may be provided via a wired or wireless WAN (Wide Area Network), LAN (Local Area Network), or via the Internet.

As described in detail above, according to a mobile operation device, a machine system, and a memory control program for the mobile operation device according to the present embodiment, it is possible to suppress an increase in memory usage and a decrease in processing speed while maintaining a reliability of the mobile operation device (machine system).

Although the embodiments of the present disclosure have been described in detail, the present disclosure is not limited to the individual embodiments described above. These embodiments include various additions and replacements without departing from the gist of the invention, or without departing from the idea and spirit of the invention derived from the content described in the claims and equivalents thereof, modification, partial deletion, and the like are possible. For example, in the above-described embodiments, the order of each operation and the order of each process are shown as an example, and are not limited to these. The same applies when numerical values or equations are used in the description of the above-described embodiments.

Regarding the above-described embodiments and variations, the following descriptions are further disclosed.

Appendix 1

A mobile operation device (3) for portable operating a machine (1) comprising:

a memory (320) including a plurality of storage units (321 to 32N);

a code imparting unit (311) configured to impart an error correction code to data in the memory (320); and an encoding region specifying unit (312) configured to specify a region for storing the data to which the error correction code is imparted.

Appendix 2

The mobile operation device (3) according to appendix 1, further comprising:

a state grasping unit (313) configured to grasp a state of the mobile operation device (3), and wherein the encoding region specifying unit (312) is configured to specify a region for storing data to which the error correction code is imparted among the plurality of storage units (321 to 32N), based on an output of the state grasping unit (313).

Appendix 3

The mobile operation device (3) according to appendix 2, further comprising:

an arithmetic processing unit (310) configured to execute an application program, and wherein the state grasping unit (313) is configured to grasp a state of the application program executed by the arithmetic processing unit (310), and the encoding region specifying unit (312) is configured to switch a capacity of a region for storing the data to which the error correction code is imparted among the plurality of storage units (321 to 32N), based on the state of the application program grasped by the state grasping unit.

Appendix 4

The mobile operation device (3) according to appendix 3, wherein the code imparting unit (311) is configured to impart an error correction code to data when the application program grasped by the state grasping unit (313) is directly related to a system, and not impart the error correction code to date when the application program grasped by the state grasping unit (313) is not directly related to the system.

Appendix 5

The mobile operation device (3) according to appendix 3 or 4, wherein the memory (320) is a main memory accessible by the arithmetic processing unit (310) and is a DRAM capable of controlling whether or not to cause any of the storage units (321 to 32N) to function the error correction code.

Appendix 6

The mobile operation device (3) according to any one of appendixes 1 to 6, wherein the machine (1) is a robot or a CNC machine tool, and the mobile operation device (3) is a teach pendant configured to teach an operation to the robot or the CNC machine tool.

Appendix 7

A machine system comprising:

the mobile operation device (3) according to any one of claims 1 to 6;

a machine control device (2) connected to the mobile operation device (3) via a communication line; and the machine (1) connected to the machine control device (2) via a communication line and operated by the mobile operation device via the machine control device (2).

Appendix 8

A memory control program for a mobile operation device (3) including an arithmetic processing unit (310), and a memory (320) including a plurality of storage units (321 to 32N) accessed by the arithmetic processing unit (310), the memory control program causing the arithmetic processing unit (320) to execute:

imparting an error correction code to data in the memory (320); and specifying a region for storing the data to which the error correction code is imparted.

Appendix 9

The memory control program for the mobile operation device (3) according to claim 8, wherein the memory control program causing the arithmetic processing unit (320) to further execute:

grasping a state of the mobile operation device (3); and switching a capacity of a region for storing the data to which the error correction code is imparted, based on the grasped state of the mobile operation device (3).

The invention claimed is:

1. A mobile operation device for portable operating a machine, the mobile operation device comprising:

a memory including a plurality of storage units;

a code imparting unit configured to impart an error correction code to data in the memory;

an encoding region specifying unit configured to specify a region for storing the data to which the error correction code is imparted; and a state grasping unit configured to grasp a state of the mobile operation device, wherein the code imparting unit is configured to impart the error correction code to the data when an application program grasped by the state grasping unit is directly related to a system, and not impart the error correction code to the data when the application program grasped by the state grasping unit is not directly related to the system, and the data when the application program grasped by the state grasping unit is not directly related to the system includes a screen shot and a log.

2. The mobile operation device according to claim 1, wherein the encoding region specifying unit is configured to specify the region for storing the data to which the error correction code is imparted among the plurality of storage units, based on an output of the state grasping unit.

3. The mobile operation device according to claim 2, further comprising:

an arithmetic processing unit configured to execute the application program, wherein the state grasping unit is configured to grasp a state of the application program executed by the arithmetic processing unit, and the encoding region specifying unit is configured to switch a capacity of the region for storing the data to which the error correction code is imparted among the plurality of storage units, based on the state of the application program grasped by the state grasping unit.

4. The mobile operation device according to claim 3, wherein the memory is a main memory accessible by the arithmetic processing unit and is a DRAM configured to control whether or not to cause any of the plurality of storage units to function the error correction code.

5. The mobile operation device according to claim 1, wherein the machine is a robot or a CNC (Computer Numerical Control) machine tool, and the mobile operation device is a teach pendant configured to teach an operation to the robot or the CNC machine tool.

6. A machine system, comprising:

the mobile operation device according to claim 1;

a machine control device connected to the mobile operation device via a communication line; and the machine connected to the machine control device via a communication line and operated by the mobile operation device via the machine control device.

7. A computer readable non-transitory tangible medium for storing a memory control program for a mobile operation device including an arithmetic processing unit, and a memory including a plurality of storage units accessed by the arithmetic processing unit, the memory control program causing the arithmetic processing unit to execute:

imparting an error correction code to data in the memory;

specifying a region for storing the data to which the error correction code is imparted; and grasping a state of the mobile operation device, wherein the error correction code is imparted to the data when an application program grasped by a state grasping unit is directly related to a system, the error correction code is not imparted to the data when the application program grasped by the state grasping unit is not directly related to the system, and the data when the application program grasped by the state grasping unit is not directly related to the system includes a screen shot and a log.

8. The computer readable non-transitory tangible medium for storing the memory control program for the mobile operation device according to claim 7, wherein the memory control program causes the arithmetic processing unit to further execute:

switching a capacity of a region for storing the data to which the error correction code is imparted, based on the grasped state of the mobile operation device.

9. A mobile operation device for portable operating a machine, the mobile operation device comprising:

a memory including a plurality of storage units;

a code imparting unit configured to impart an error correction code to data in the memory;

an encoding region specifying unit configured to specify a region for storing the data to which the error correction code is imparted; and a state grasping unit configured to grasp a state of the mobile operation device, wherein the machine is a robot or a CNC (Computer Numerical Control) machine tool, the code imparting unit is configured to impart the error correction code to the data when an application program grasped by the state grasping unit is directly related to a system, and not impart the error correction code to the data when the application program grasped by the state grasping unit is not directly related to the system, and the data when the application program grasped by the state grasping unit is directly related to the system is data where an error occurs due to an electromagnetic noise from the robot or the CNC machine tool.

10. The mobile operation device according to claim 9, wherein the encoding region specifying unit is configured to specify the region for storing the data to which the error correction code is imparted among the plurality of storage units, based on an output of the state grasping unit.

11. The mobile operation device according to claim 10, further comprising:

an arithmetic processing unit configured to execute the application program, wherein the state grasping unit is configured to grasp a state of the application program executed by the arithmetic processing unit, and the encoding region specifying unit is configured to switch a capacity of the region for storing the data to which the error correction code is imparted among the plurality of storage units, based on the state of the application program grasped by the state grasping unit.

12. The mobile operation device according to claim 11, wherein the memory is a main memory accessible by the arithmetic processing unit and is a DRAM configured to control whether or not to cause any of the plurality of storage units to function the error correction code.

13. A machine system, comprising:

the mobile operation device according to claim 9;

a machine control device connected to the mobile operation device via a communication line; and the machine connected to the machine control device via a communication line and operated by the mobile operation device via the machine control device.

14. A computer readable non-transitory tangible medium for storing a memory control program for a mobile operation device including an arithmetic processing unit, and a memory including a plurality of storage units accessed by the arithmetic processing unit, the memory control program causing the arithmetic processing unit to execute:

imparting an error correction code to data in the memory;

specifying a region for storing the data to which the error correction code is imparted; and grasping a state of the mobile operation device, wherein a machine is a robot or a CNC (Computer Numerical Control) machine tool, the error correction code is imparted to the data when an application program grasped by a state grasping unit is directly related to a system, the error correction code is not imparted to the data when the application program grasped by the state grasping unit is not directly related to the system, and the data when the application program grasped by the state grasping unit is directly related to the system is data where an error occurs due to an electromagnetic noise from the robot or the CNC machine tool.

15. The computer readable non-transitory tangible medium according to claim 14, wherein the memory control program causes the arithmetic processing unit to further execute switching a capacity of a region for storing the data to which the error correction code is imparted, based on the grasped state of the mobile operation device.

* * * * *